April 30, 1957
S. ROBERTS
TOTAL CALLS REGISTRATION ARRANGEMENT FOR TELEPHONE SYSTEMS
Filed July 21, 1955
2,790,850
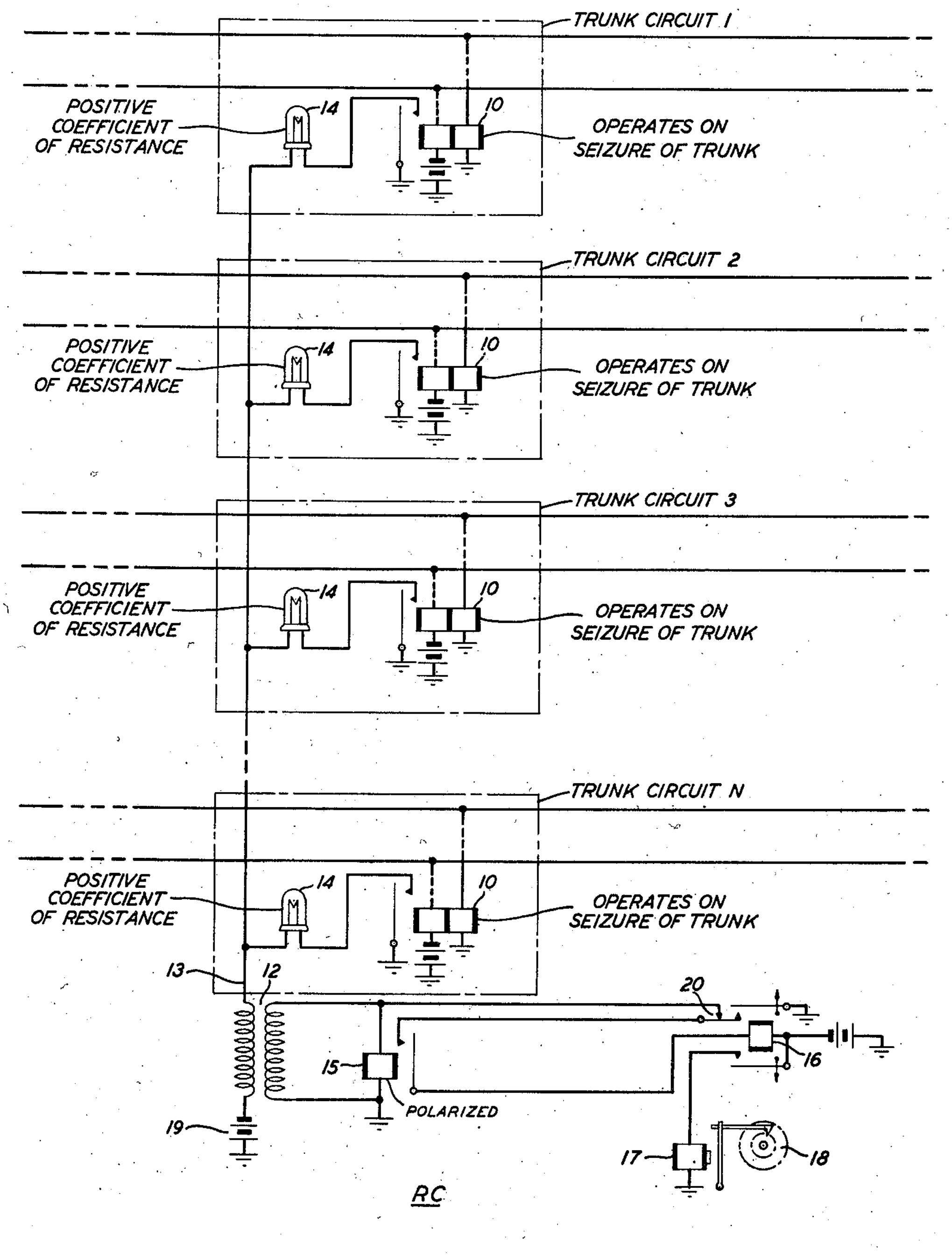
INVENTOR
S. ROBERTS
BY A. F. Kane
ATTORNEY 2,790,850
Patented Apr. 30, 1957

2,790,850

TOTAL CALLS REGISTRATION ARRANGEMENT FOR TELEPHONE SYSTEMS

Stanley Roberts, Brooklyn, N. Y., assignor to Bell Telephone Laboratories, Incorporated, New York, N. Y., a corporation of New York Application July 21, 1955, Serial No. 523,463

6 Claims. (Cl. 179—10)

This invention relates to systems for checking the frequency of use of telephone central office equipment and particularly to a total-calls registration device for use in the telephone plant.

In telephone exchanges, frequent and, in some circumstances, continuous studies are made to determine traffic conditions which prevail thereat and to otherwise check the capacity of an exchange to handle the volume of traffic encountered. One of the instrumentalities employed in making such studies is the total-calls register, which functions to register the number of calls handled in the exchange during some predetermined time interval, or the number of times a particular circuit or the circuits of a particular group of circuits are used for communication purposes. A true count of such events has been obtained automatically heretofore only when one such instrumentality is allocated to each circuit to be observed. However, the operation of such registers on a one-per-circuit basis does not lend itself to the generation of the large quantity of data required for evaluating the efficiency at which an exchange is operating unless a prohibitively large number of such devices is provided. Multicircuit registers have been known to frequently introduce counting errors in those instances where circuits are seized in rapid succession. In such instances, those calls, or circuit seizures which occur while the register is engaged in recording a previous call or circuit seizure, go uncounted.

It is one object of this invention to provide a simple and improved means for controlling the operation of a total-calls register whereby a single register functions, with a high degree of accuracy, to record successive occurrences of call-indicating, or circuit-seizure conditions on a multiplicity of telephone circuits.

This object is attained in accordance with a feature of the invention by the provision of means for translating successive prolonged closures of a plurality of parallel circuits into repeated momentary circuit closures and counting the latter on a single registration device. More particularly and in accordance with a particular embodiment of the invention, a common register control circuit, upon the seizure of any of a group of circuits, such as telephone trunk circuits, is subjected to an inductive surge of predetermined direction and of initially high amperage which results in the operation of a register-controlling polar relay. The inductive surge is generated, incident to a trunk seizure, in the secondary winding of a transformer whose primary circuit is completed from battery to ground through a trunk resistor having a positive temperature coefficient of resistance. When the transformer primary circuit is closed across a potential, an induced transient signal momentarily operates the polar relay which in turn causes the operation of the associated register. As the trunk resistor heats, the resistance rises and the steady-state current through the transformer primary is reduced. This reduces the shunting effect of other resistors when added in parallel and permits a greater number of trunk seizures to operate the register circuit. Because of the normal low resistance of the resistors in their cold state, the closure of any additional multiple connection provides high signal current in the transformer primary to permit reoperation of the polar relay. The resistor having a positive temperature coefficient of resistance is illustrated, for exemplary purposes, as a tungsten filament lamp. It is understood that other forms of resistors having similar characteristics may be employed.

The invention will be better understood from the following detailed description when read with reference to the accompanying drawing, the single figure of which illustrates a group of telephone trunk circuits, each of which has access to a common register circuit by way of an individual resistor having a positive temperature coefficient of resistance.

In the exemplary disclosure, each trunk circuit is illustrated as having a relay 10 associated therewith. It is to be understood that any other means which is individual to a trunk circuit and which responds to, or identifies the seizure of the trunk may be employed in place of the relay 10 just so long as it functions to apply ground potential to the common lead, or conductor 13 in recognizing the seizure of the trunk.

The common conductor 13 is provided with a plurality of parallel branch circuits, one for each trunk served by the register circuit RC. Each parallel branch circuit includes the filament of a tungsten lamp 14 and the front armature contact of the corresponding trunk relay 10. The armature of each relay is shown connected to ground potential. The common portion of conductor 13 terminates in the upper terminal of the primary winding of transformer 12, the other terminal of which is connected to grounded battery 19.

The register circuit RC may be said to include the secondary winding of transformer 12, polar relay 15, slow-to-release relay 16, register 18 and its controlling electromagnet 17. The winding of polar relay 15 is connected across the secondary winding of transformer 12 and thus responds to current induced in the transformer secondary as the result of the flow of current in the transformer primary. When relay 15 operates, it completes an operating circuit for slow-to-release relay 16 which extends from grounded battery, through the winding of relay 16, the armature and front contact of relay 15, the normally closed continuity contacts 20 of relay 16, the secondary winding of transformer 12 and the winding of parallel connected relay 15 to ground.

Relay 16, operated, completes an obvious operating circuit for magnet 17 which functions, in well-known manner, to operate the register 18 one step and cause it to register one unit. At its upper armature, relay 16 opens the continuity contacts 20 and thus opens its own operating circuit. After a short interval of time, relay 16 releases. Before the contacts 20 are opened, the ground potential associated with the upper armature of relay 16 shunts down relay 15 to insure the immediate release of relay 15 and also the further opening of the energizing circuit for relay 16. This further insures the release of relay 16 and the opening of the operating circuit for magnet 17. Thus the normal condition of the register circuit RC is restored.

Assume now that trunk circuit No. 1 is seized for communication purposes and its seizure is manifested by the operation of the corresponding trunk relay 10. Relay 10 of trunk No. 1, operated, completes the connection of the common conductor 13 to ground potential by way of the filament of tungsten lamp 14. Because of its positive temperature coefficient of resistance, the lamp 14, in its cold state, introduces small resistance in series with the primary winding of transformer 12 so that a signal current of relatively high amperage builds up in the transformer primary causing a corresponding current to be induced in the transformer secondary winding. The direction of flow of this latter current is such as to cause polar relay 15 to operate, as previously described. The operation of relay 15 results in the operation of relay 16 and of register 18, also as previously described. As the transient current traverses the filament of lamp 14 associated with trunk No. 1 and approaches the steady state, the lamp filament heats up and increases in resistance. As the heated lamp reduces the steady-state current in the primary of transformer 12, the transformer is operated at a lower point on its saturation curve. Due to the non-linear resistance characteristic of the lamp 14, that is, low resistance when cold and higher resistance when heated, the closure of the multiple circuit including the resistor 14 of trunk No. 1 results in a relatively high signal to operate relay 15 of the register circuit RC which is limited only by the low resistance of the cold lamp and the primary winding of transformer 12. Thus the current of initially high amperage, which results in the operation of relay 15, decreases considerably as the steady state of the current is reached due to the non-linear characteristic of lamp 14 of trunk No. 1.

Should trunk No. 2 or any other trunk be seized while the primary winding of transformer 12 is still traversed by the steady-state current resulting from the operation of relay 14 associated with trunk No. 1, the cold condition of lamp 14, associated with trunk No. 2, which lamp is now connected in multiple with lamp 14 of trunk No. 1, results in a second relatively high transient signal current in the primary winding of transformer 12 which causes the momentary reoperation of polar relay 15 and the consequent second operation of register 18. It is understood, as previously described, that each operation of relay 15 is momentary in duration because of the operation of relay 16 which effects the immediate release of relay 15 and also of register magnet 15. As the transient signal diminishes, the lamps 14 of both trunks Nos. 1 and 2 assume higher resistance values thereby limiting the steady-state current flowing through the primary of transformer 12.

Because of the low resistance of the lamps 14 in their cold state, the closure of each successive multiple provides similar signals and results, thus permitting a greater number of trunk seizures to be registered than if the resistors 14 were omitted.

When any or each multiple, including a resistor 14, is disassociated from the peg count circuit, the polar relay does not operate on the resulting current surge because of the polarity of the signal.

It is apparent that each trunk seizure is accompanied by a transient surge of current through the primary winding of transformer 12 which produces a corresponding induced surge in the transformer secondary winding. It is also apparent that because of the non-linear characteristic of the resistors 14, the initial current surge is of relatively high amperage and the ensuing steady-state current in the transformer primary is of relatively low amperage. Thus the transformer primary is available for and responds to repeated transients of relatively high amperage even when traversed by the steady-state current resulting from the prolonged operation of the trunk relays 10. In this manner a relatively large number of circuit seizures may be registered on a single register by translating successive prolonged closures of a plurality of parallel circuits into register-controlling momentary circuit closures.

In the exemplary disclosure relay 16 of the register circuit RC is shown exercising direct control of the register 18. It is to be understood that such relay may be used to step a selector switch which, in turn, will store the count and pour it into a register circuit immediately after each step or at some later time as conditions warrant. This is an obvious alternative arrangement.

What is claimed is:

1. The combination in a telephone system, of a plurality of trunk circuits, a register circuit common to said trunk circuits, including a register, a control circuit for said register circuit comprising the primary winding of a transformer, a source of current and a common conductor, means including the secondary winding of said transformer for coupling said register circuit with said control circuit, a parallel branch circuit for each of said trunk circuits extending from said common conductor, each including a resistor having a positive temperature coefficient of resistance, means responsive to the seizure of any of said trunk circuits for effectively including the corresponding parallel branch circuit in an energizing circuit with the primary winding of said transformer and said source of current whereby the seizure of a trunk circuit produces a transient signal in the primary winding of said transformer to induce a corresponding signal in the secondary winding of said transformer and said resistor functions to reduce the steady-state current in said energizing circuit, and means in said register circuit responsive to said induced signal for operating said register.

2. A telephone system according to claim 1 in which the register-operated means in said register circuit is responsive to an induced signal in said transformer secondary winding in but one direction.

3. A telephone system according to claim 1 in which the register-operating means in said register circuit includes a polarized relay.

4. A telephone system according to claim 1 in which said register circuit includes means which functions upon operation of said register-operating means to immediately restore said register-operating means to normal unoperated condition.

5. In combination, a plurality of trunk circuits, a register circuit including a register, a control circuit for said register circuit including a transformer primary winding, a source of current and a common lead, a branch circuit for each of said trunk circuits, means responsive to the seizure of a trunk for completing a circuit comprising the corresponding branch circuit and said control circuit whereby a transient current flows in said transformer primary and eventually reaches a steady state, means including a transformer secondary for rendering the register of said register circuit operative on said transient current to register said trunk seizure, and means included in each of said branch circuits for reducing the steady-state current in said transformer primary, said means including a resistor having a positive temperature coefficient of resistance, whereby said control circuit is rendered effective to cause the operation of said register to record subsequent trunk seizures while traversed by the steady-state current resulting from the said first trunk seizure.

6. In combination, a plurality of trunk circuits, a register circuit for registering seizures of said trunks including a transformer having primary and secondary windings, a source of current, a resistor associated with each of said trunks having a positive temperature coefficient of resistance, and means individual to each of said trunks for including its corresponding resistor in circuit with the primary winding of said transformer and said source of current to generate in said transformer primary a transient signal, a register, means responsive to said transient signal for operating said register, and means, included in said register operating means, for restoring said register operating means to normal unoperated condition.

References Cited in the file of this patent

UNITED STATES PATENTS

| | | |
|---|---|---|
| 2,024,275 | Clark | Dec. 17, 1935 |
| 2,084,104 | Myers | June 15, 1937 |
| 2,686,836 | Deakin | Aug. 17, 1954 |

OTHER REFERENCES

War Department Technical Manual, TM 11-4316, August 1945, pages 25, 26.